United States Patent [19]

Hazenbroek

[11] Patent Number: 4,514,879
[45] Date of Patent: May 7, 1985

[54] SUSPENDED FEATHER PICKER WITH ROTATABLE SECTIONS

[76] Inventor: Jacobus E. Hazenbroek, Burg de Zeeuwstraat 52, Numansdorp, Netherlands

[21] Appl. No.: 461,145

[22] Filed: Jan. 26, 1983

[51] Int. Cl.³ .......................................... A22C 21/02
[52] U.S. Cl. ................................................ 17/11.1 R
[58] Field of Search .................................... 17/11.1 R

[56] References Cited

U.S. PATENT DOCUMENTS

| | | | |
|---|---|---|---|
| 2,908,033 | 10/1959 | Zebarth | 17/45 |
| 3,044,108 | 7/1962 | DeLong | 17/11.1 |
| 3,197,809 | 8/1965 | Corn et al. | 17/11.1 |
| 3,203,035 | 8/1965 | DeLong | 17/11.1 |
| 3,234,587 | 2/1966 | Corn | 17/11.1 |
| 3,235,904 | 2/1966 | Brown et al. | 17/11.1 |
| 3,273,198 | 9/1966 | Tomlinson | 17/11.1 |
| 3,402,424 | 9/1968 | Brown et al. | 17/11.1 |
| 3,471,893 | 10/1969 | Zebarth et al. | 17/11.1 |
| 3,477,093 | 11/1969 | Zebarth et al. | 17/11.1 R |
| 3,524,217 | 8/1970 | Schuster | 17/11.1 R |
| 3,585,675 | 6/1971 | Crane | 17/11.1 |
| 3,611,475 | 10/1971 | Harben, Jr. | 17/11.1 |
| 3,740,793 | 6/1973 | Crawford et al. | 17/11.1 |
| 3,747,159 | 7/1973 | Harben, Jr. | 17/11.1 |
| 4,064,596 | 12/1977 | Crane | 17/11.1 R |
| 4,179,772 | 12/1979 | Harben, Jr. | 17/47 |
| 4,217,678 | 8/1980 | Crawford et al. | 17/11.1 R |

*Primary Examiner*—Willie G. Abercrombie
*Attorney, Agent, or Firm*—Thomas & Kennedy

[57] ABSTRACT

Two banks of feather pickers 65 and 66 are suspended from overhead parallel support beams 22 and 23 on opposite sides of the path of travel of a series of poultry carcasses moving along an overhead conveyor system. A pair of movable frame members 30, 31 and 32, 33 extend downwardly from each support beam, and each bank of pickers is rotatably supported at its opposite ends on a support sleeve 45 mounted to a movable frame member, with an elevator screw 48 arranged to lift and lower the support sleeve on each movable frame member. The picking fingers 98 protrude from rotary picking disks 91 that are supported on platforms 70-72 mounted within a cabinet 62, with the picking fingers normally protruding from an open side of each cabinet toward the opposite bank of pickers. The picking finger support platforms are tiltable with respect to one another so as to locate the ends of the picking fingers in positions to engage the birds. The banks of pickers can be rotated on their horizontal axes so as to orient the picking fingers directly away from the opposite bank of pickers, and the picking fingers and other elements of the apparatus can be cleaned, repaired, replaced, etc. without obstruction from the opposite bank of pickers.

7 Claims, 6 Drawing Figures

SUSPENDED FEATHER PICKER WITH ROTATABLE SECTIONS

BACKGROUND OF THE INVENTION

The invention disclosed herein generally relates to poultry defeathering apparatus for removing feathers from birds that are transported in series along an overhead conveyor system. More specifically, the disclosed invention includes two banks of pickers that are suspended from overhead support beams, with the banks of pickers arranged on opposite sides of the path of travel of the poultry carcasses, with each bank of pickers having rotatable picking disks with flexible picking fingers attached thereto and arranged to engage and wipe the feathers from the poultry carcasses, with the banks of pickers being rotatably supported on horizontal axes so that the fingers, disks and other elements can be turned over to face directly away from the opposite bank of pickers and the fingers, etc. can be cleaned, replaced and otherwise maintained.

In modern poultry processing plants the birds are hung or suspended in an inverted or head-down attitude from an elevated overhead conveyor and moved in sequence by the conveyor through various processing stations in which the birds are killed, defeathered, opened and eviscerated. When the birds reach the defeathering apparatus, a multiple number of flexible picking fingers engage the bird carcasses and rub against the feathers and the skin of the birds so as to remove the feathers.

It is important that the feather picking equipment be adjustable to bring the ends of the flexible picking fingers into engagement with the entire surface area of the rather irregularly shaped birds, and if the size of the birds to be processed is changed it is necessary to reorient the positions of the picking fingers. For example, it may be necessary to raise or to lower the picking fingers to accommodate smaller or larger birds, to move the picking fingers further away from or closer to the path of travel of the birds to accommodate larger or smaller birds, and to tilt the picking fingers so as to engage the more horizontal surfaces of the birds. While the various prior art feather picking equipment has included adjustments for the positions of the picking fingers, it has been somewhat difficult for maintenance personnel to replace worn or damaged picking fingers and to clean the facing surfaces of the opposed banks of pickers. The picking fingers of one bank of pickers face the opposing bank of pickers, and the maintenance personnel must position themselves between the banks of pickers when replacing the picking fingers or when cleaning or performing other maintenance functions on the banks of pickers.

SUMMARY OF THE INVENTION

Briefly described, the present invention comprises a suspended feather picker for use in combination with an overhead poultry conveyor system, wherein banks of feather pickers are suspended on opposite sides of the path of travel of a series of poultry carcasses. Parallel support beams are positioned over the overhead conveyor system, and pairs of movable frame members are suspended from each support beam on opposite sides of the path of travel of the poultry carcasses. The banks of pickers are rotatably suspended at each of their ends on a movable frame member. The movable frame members can be moved along the parallel support beams toward or away from the path of travel of the poultry carcasses, the ends of the banks of pickers can be elevated on the movable frame members, and the banks of pickers are supported in tiltable support platforms on cabinets so that the platforms can be oriented to place the ends of the picking fingers in the proper location for engaging the carcasses.

The suspension of the banks of pickers from the overhead parallel support beams locates most of the supports and adjusting devices of the assembly above the picking fingers, so that the feathers and other matter removed from the poultry carcasses tend to fall freely beneath the apparatus.

Thus, it is an object of this invention to provide a suspended feather picker with rotatable banks of pickers in which the banks of pickers can be rotated to orient the picking fingers away from the opposite bank of pickers for the purpose of replacing and cleaning the picking fingers and other elements of the apparatus without obstruction with the other bank of pickers and related elements of the apparatus.

Another object of this invention is to provide an improved poultry picking apparatus in which opposed banks of feather pickers are suspended on opposite sides of an overhead conveyor system, which includes banks of pickers that are tiltable on horizontal axes so as to selectively orient the picking fingers either toward the path of travel of the poultry carcasses moving between the banks of pickers during the normal operation of the equipment or outwardly away from the path of travel of the poultry carcasses during maintenance of the equipment.

Other objects, features and advantages of the present invention will become apparent upon reading the following specification, when taken in conjunction with the accompanying drawings.

DETAILED DESCRIPTION

Figure 1:
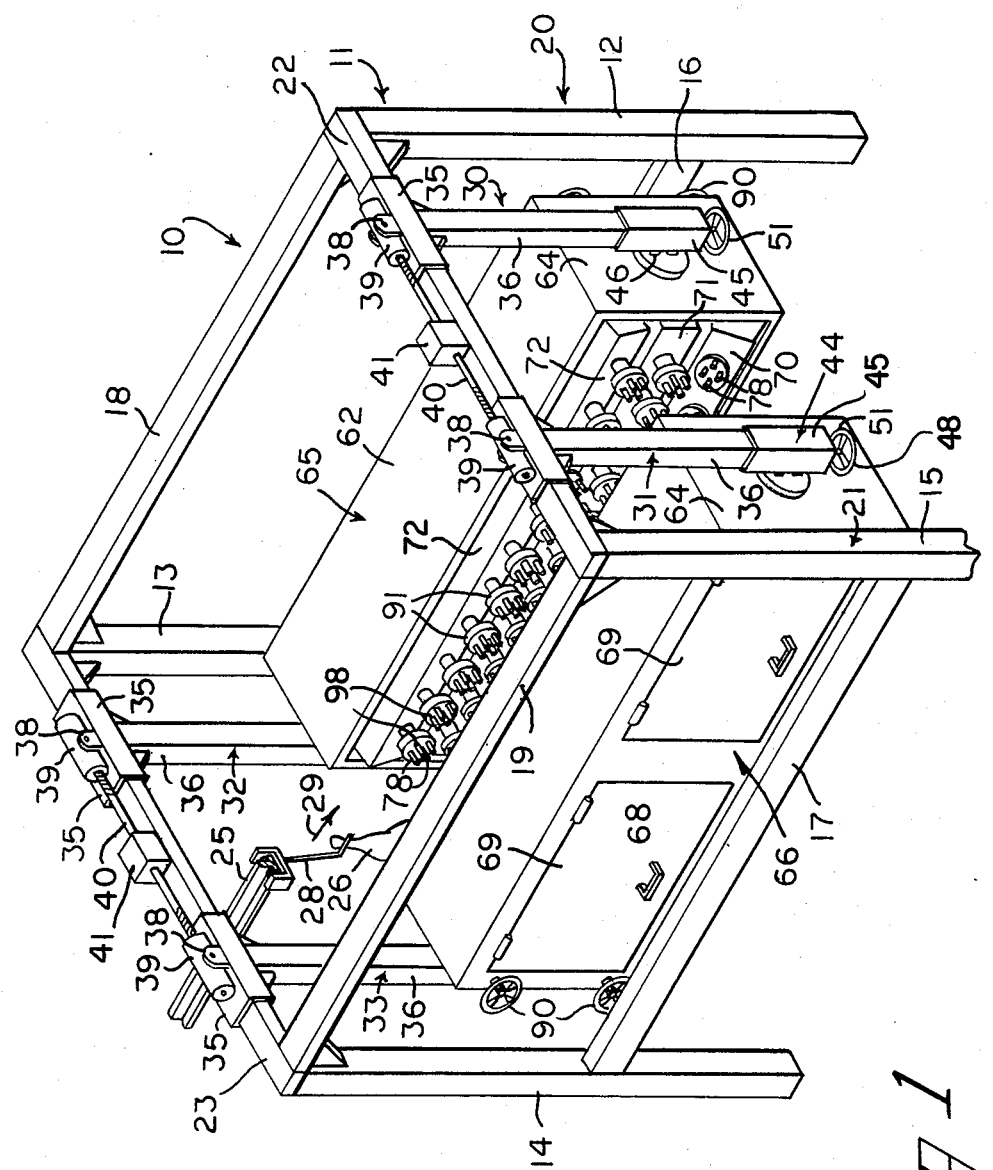
FIG. 1 is a perspective illustration of the suspended feather picker.
Figure 2:
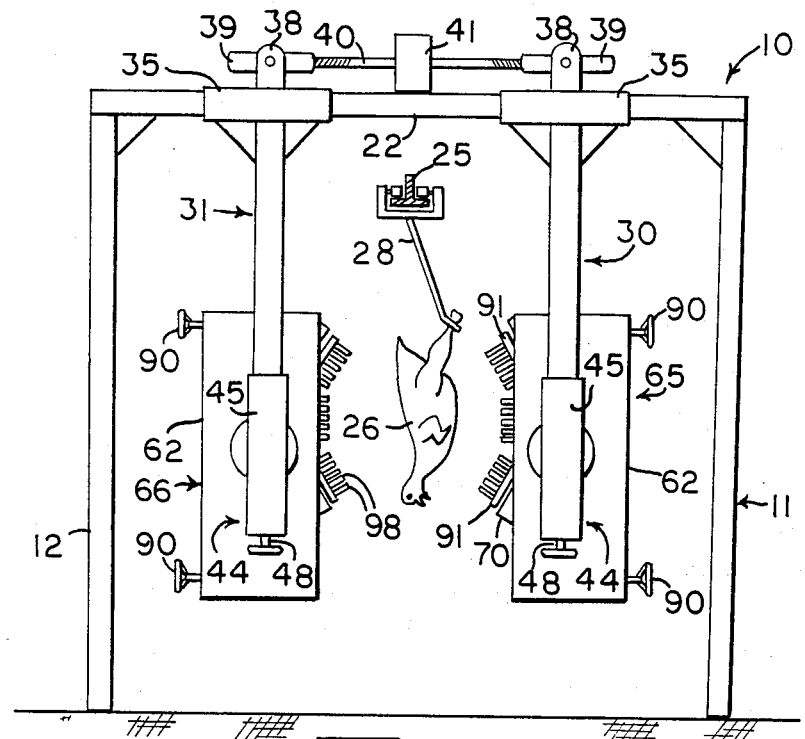
FIG. 2 is an end view of the feather picker.

Referring now in more detail to the drawings, in which like numerals indicate like parts throughout the several views, FIG. 1 illustrates the feather picker 10 which includes a support frame 11 having upstanding legs 12, 13, 14 and 15, lower side braces 16 and 17 and upper side braces 18 and 19. Legs 12 and 13, lower side brace 16 and upper side brace 18 form one side frame 20, while legs 14 and 15, lower side brace 17 and upper side brace 19 form opposing side frame 21. Parallel support beams 22 and 23 are supported from the upper ends of legs 12, 15 and 13, 14 and span the space between the side frame 20 and 21. The parallel support beams 22 and 23 are supported at a height sufficient to span the conveyor line 25, with the birds 26 suspended from shackles 28 moving in series along the conveyor line. The overhead conveyor 25 is of conventional construction and its shackles 28 move the birds 26 in sequence along a predetermined path of travel. The path of travel is indicated by the arrow 29. The support frame 11 of the feather picker is positioned about the conveyor line so that the parallel support beams 22 and 23 form a right angle with respect to the path of travel of the poultry carcasses.

A pair of movable frame members 30 and 31 are mounted on support beam 22, and a similar pair of movable frame members 32 and 33 are mounted on support beam 23. Movable frame members 30 and 31 extend downwardly from the support beam 22 on opposite sides of the path of travel of the birds through the feather picker, while movable frame members 32 and 33 also extend downwardly from their support beam 23 on opposite sides of the path of travel of the poultry carcasses.

Each movable frame member 30-33 includes an upper support sleeve 35 which is telescopically mounted about one of the parallel support beams 22 or 23, and a downwardly extending support leg 36 which is rigidly attached at its upper end to the midpoint of the support sleeve 35. A bracket 38 is mounted to the upper surface of each support sleeve 35, and an internally-threaded block 39 is mounted in bracket 38. Travel screw 40 has threads of reverse pitch on its opposite ends, and the threads are received in the internally-threaded blocks 39. Reversible motor 41 can be operated to rotate the travel screw in either direction. This causes the movable frame members 30 and 31, and 32 and 33 to move toward or away from each other, which would be toward or away from the path of travel 29 of the birds 26.

Figure 5:
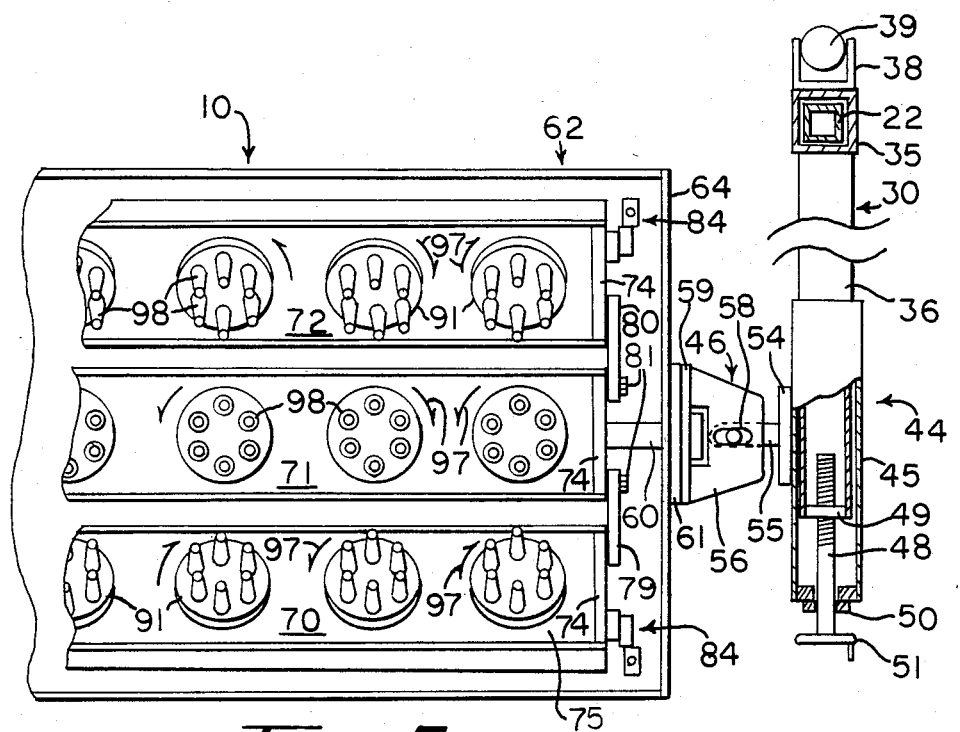
FIG. 5 is a partial side-elevational view of the face of a bank of pickers, and a partial cross-sectional view of a support element connected between the bank of pickers and a movable frame member.

Support elements 44 are mounted on the lower end portion of each support leg 36 of each frame member 30-33. Each support element comprises a sleeve 45 extending about a support leg 36 and a universal joint 46 (FIG. 5). Sleeve 45 is telescoped upwardly about support leg 36, and an elevator screw 48 extends upwardly through the lower end portions of both sleeve 45 and support leg 36. An internally threaded bore is formed through an end block 49 at the lower portion of support leg 36, and receives the threaded elevator screw 48. A collar 50 is rigidly connected to elevator screw 48 to below sleeve 45. With this arrangement, the elevator screw 48 supports sleeve 45 from support leg 36. When elevator screw 48 is rotated by manipulating its handle 51, the support element 44 moves up or down the support leg 36, depending upon the direction of rotation of the elevator screw.

As illustrated in FIG. 5, universal joint 46 comprises a support plate 54 which is rigidly mounted to sleeve 45, T-shaped support bar 55 rigidly mounted to and extending from support plate 54, and bifurcated yoke 56 that receives T-shaped support bar 55 with the head of the T extending through elongated openings 58. Yoke 56 is rigidly mounted to axle support disk 59, and axle 60 extends through a central opening of the axle support disk. Axle 60 is rotatable with respect to axle disk 59. Cabinet support disk 61 is rigidly connected to an end wall 64 of cabinet 62, and an opening (not shown) extends through the cabinet support disk, and the opening is mounted about the axle 60. Therefore, cabinet 62 is supported by axle 60 and universal joint 46.

Banks of pickers 65 and 66 are positioned on opposite sides of the path of travel 29 of the poultry carcasses 26, by suspending each bank of pickers at its ends with the movable frame members 30-33. Each bank of pickers includes a housing or cabinet 62 which has parallel, opposed end walls 64, parallel, opposed top and bottom walls 66 and back wall 67. The facing portions of the cabinets 62 are open, and openings 68 are formed in back walls 67. Doors 69 are hingedly mounted so as to normally close the openings 68.

Support platforms 70, 71 and 72 are supported by axle 60 (FIG. 5) within each cabinet 62. Each support platform 70-72 comprises opposed end walls 74, front wall 75 (FIG. 3), bottom and top walls 76 and 77 and rear closure walls 78. Axles 60 (FIG. 5) protrude outwardly from the end surfaces of opposed end walls 74 of middle support platforms 71. The end walls of the lower and upper platforms 70 and 72 are pivotably connected to the end walls of the middle support platform 71 by means of straps 79 and 80, with the straps being rigidly connected to the opposed end walls of the lower and upper support platforms and pivotably connected by bolts 81 to the end walls of the middle support platform.

Figure 3:
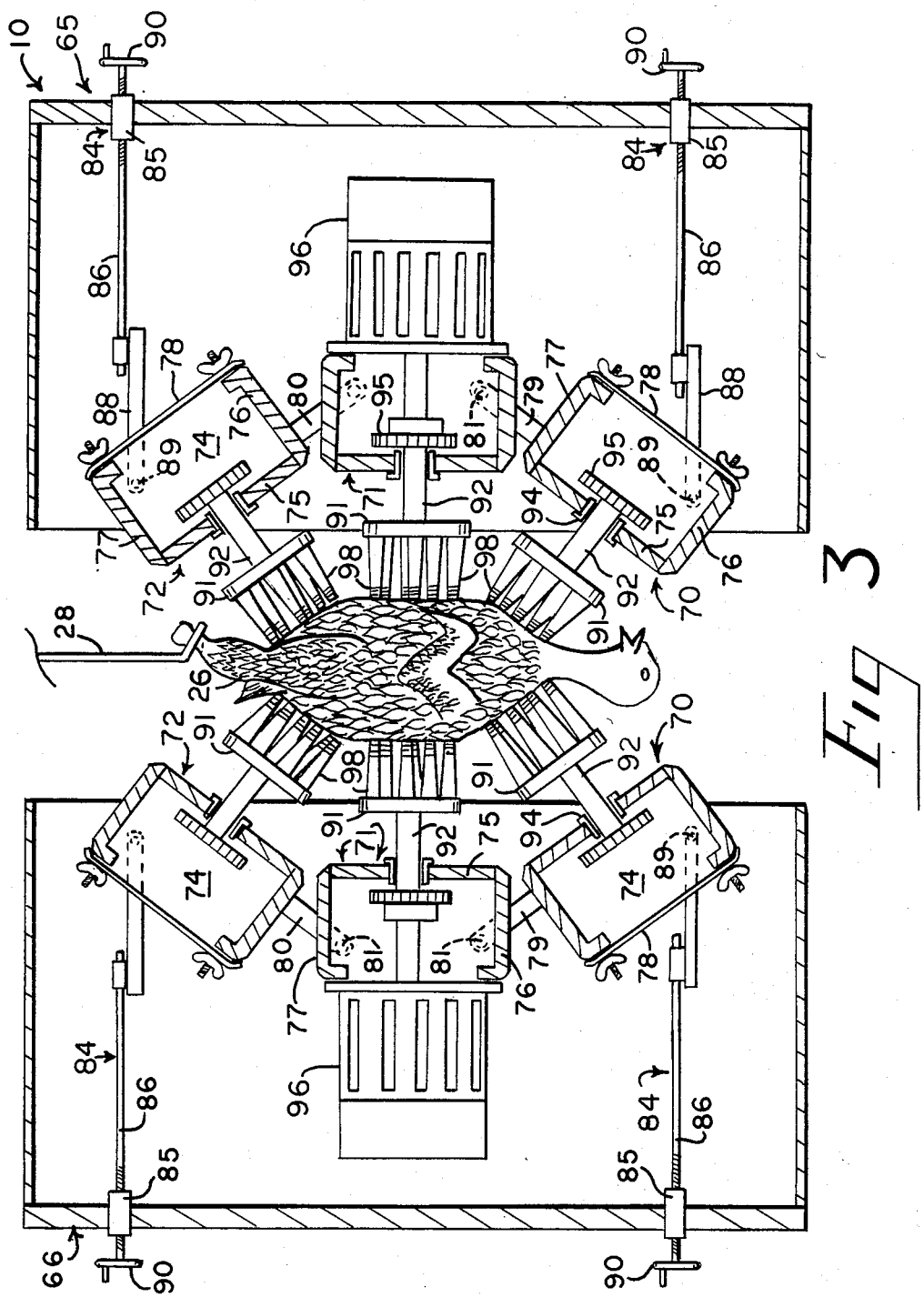
FIG. 3 is an end cross-sectional illustration of the feather picker, showing the picking fingers as they might be oriented for engaging a poultry carcass.

As illustrated in FIGS. 3 and 5, an adjusting means 84 controls the attitude of each end of the lower and upper support platform 70 and 72. Each adjusting means 84 comprises an internally threaded socket 85 rigidly mounted to the interior framework of cabinet 65, 66, threaded screw 86 threaded through socket 84, and lever 88 connected at one end to an end of threaded screw 86 and connected at its other end by pivot pin 89 to an end wall 74 of a lower or upper support platform 70 or 72. A hand crank 90 is connected to the protruding end portion of the threaded screws 86 and extends out of the cabinet 62 so that the threaded screws can be rotated by an operator from outside the cabinet. Rotation of a threaded screw 86 causes a lower or upper support 70 or 72 to tilt with respect to the middle support platform 71.

Figure 4:
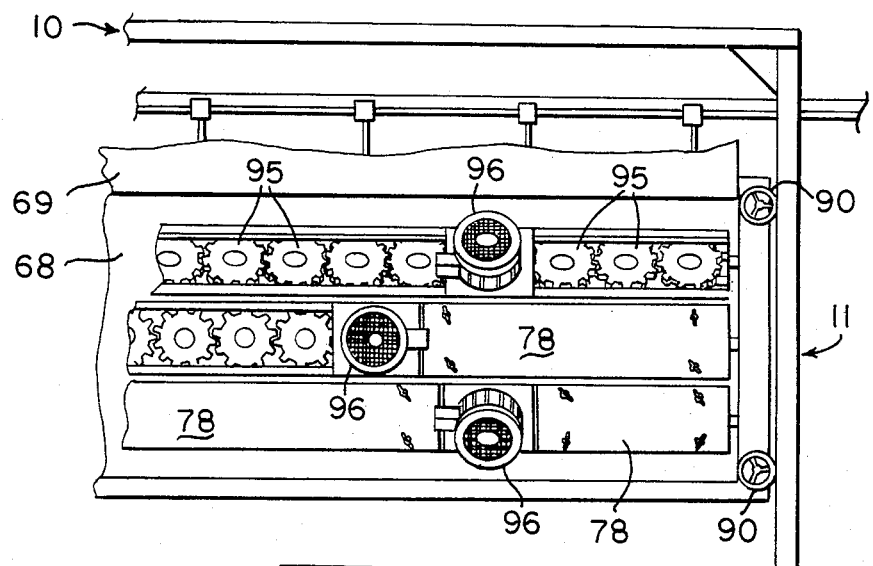
FIG. 4 is a partial side-elevational view of one end portion of the feather picker, showing the rear portion of the cabinet with one of the cabinet doors open.

As illustrated in FIGS. 3, 4 and 5, a plurality of picking disks 91 are supported by lower, middle and upper support platform 70-71. Each picking disk has an axle 92 extending at a right angle from its rear surface through an opening 94 formed through the front wall 75 of the support platform, and a gear 95 is mounted on the internal end portion of the axle 92. The picking disks 91 are closely spaced along the length of each support platform 70-72, and the gears 95 are large enough so that the gears of adjacent picking disks mesh. Motors 96 (FIG. 4) function as drive means for some of the picking disks 91, and the meshing of the gears 95 causes the picking disks of a support platform to rotate in unison, with alternate ones of the picking disks rotating in opposite directions of rotation.

A plurality of picking fingers 98 are attached to each picking disk 91 in a cantilever connection. The picking fingers 98 are flexible and are fabricated, for example, from a natural rubber material. When the picking disks 91 are rotated as previously described, the picking fingers tend to move in a circular path, with their distal ends directed toward the path of travel of the poultry carcasses. The picking disks rotate in the directions as indicated by arrows 97 (FIG. 5).

Figure 6:
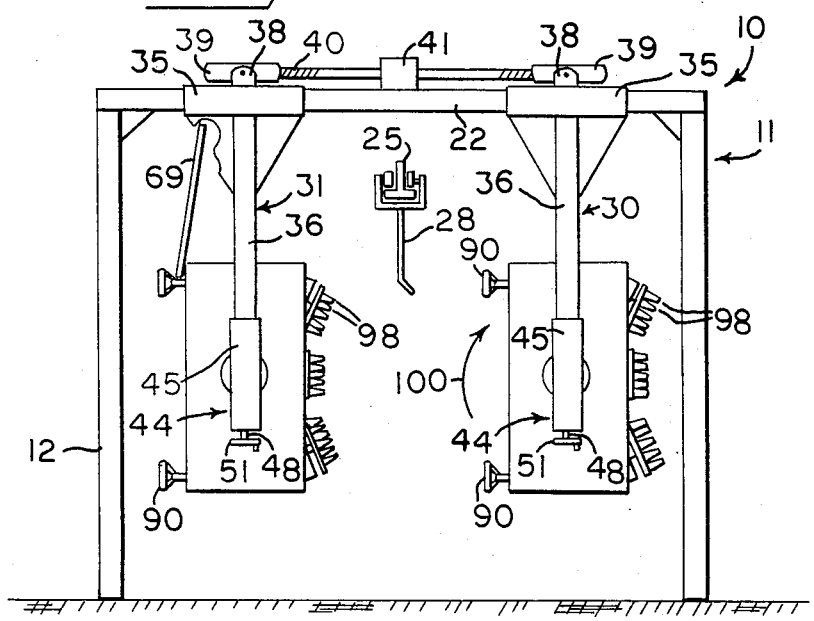
FIG. 6 is an end elevational view, similar to FIG. 2, but illustrating one of the banks of pickers rotated so that its picking fingers are directed away from the opposite bank of pickers, so as to facilitate the replacement of the picking fingers and other maintenance functions.

As illustrated in FIG. 6, when the feather picker apparatus is not in operation and is to be cleaned, either or both banks of pickers 65 can be turned over so that the picking fingers 98 face in a direction opposite from the other bank, where the worker can have immediate access to each picking finger and each picking disk without obstruction from the opposite bank or from any other object associated with the apparatus. The picking fingers can be removed and replaced with new fingers, and the equipment can be readily cleaned. For example, during a break in the operation of a poultry plant the banks of picking fingers can be rotated as indicated by arrow 100 until the picking fingers face outwardly of the apparatus, the picking fingers, disks and support platforms can be washed down with a stream of fresh water, and the apparatus can be inspected for wear, damage, etc. If necessary, some of the old picking fingers can be removed and replaced with new picking fingers, and then the cabinet can be tilted back to its operative position where it faces the path of travel of the birds. All of this can be done without disturbing the attitude of the lower and upper support platforms with respect to the central platform, without changing the elevation of the banks of pickers, and in some cases without having to move the banks of pickers apart from each other.

When the type of bird being processed is changed on the processing line, as from a small bird to a larger bird, the feather picker apparatus can be rapidly adjusted to accommodate the different size bird. For example, the banks of pickers can be raised and lowered by rotating the elevator screws 48, and banks of pickers can be drawn closer together or moved further apart by rotating the travel screw 40, and the lower and upper support platforms can be tilted by rotating the handle cranks 90. All of these adjustments can be made while the apparatus is in operation.

While this invention has been described in detail with particular reference to a preferred embodiment thereof, it will be understood that variations and modifications can be effected within the spirit and scope of the invention as described hereinbefore and as defined in the appended claims.

I claim:

1. Apparatus for picking feathers from suspended poultry carcasses moving in succession along a predetermined path of travel comprising:
    a support frame for positioning along the path of travel of the poultry carcasses,
    two banks of pickers suspended from said support frame for positioning on opposite sides of the path of travel of the poultry carcasses,
    each of said banks of pickers comprising a housing with an open side, a plurality of rotatable disks with flexible feather picking fingers supported from said rotatable disks and projecting from the open side of said housing toward the path of travel of the poultry carcasses,
    said support frame including means for rotatably supporting said banks of pickers on laterally spaced, horizontal axes extending parallel to the path of travel of the poultry carcasses for rotational movement about the axes sufficient for the open side of each bank of pickers to face in the opposite direction away from the path of travel of the poultry carcasses and away from the other bank of pickers to permit the picking fingers of one bank of pickers to be replaced and cleaned without physical obstruction from the other bank of pickers.

2. The apparatus of claim 1 and wherein said support frame includes parallel support beams for positioning above and extending over an overhead conveyor line at right angles with respect to the path of travel of the poultry carcasses, a pair of movable frame members vertically suspended from each support beam for extending downwardly on opposite sides of the path of travel of the poultry carcasses and movable along the length of the support beams toward and away from the path of travel of the poultry carcasses, means for moving said movable frame members along the lengths of the support beams, said means for rotatably supporting said banks of pickers comprising mounting means for mounting an end of each housing to the lower end portion of each said movable frame member.

3. The apparatus of claim 2 and wherein said mounting means each comprises a support element movably supported on the lower end portion of a movable frame member, and a universal joint connected between the support element and an end portion of one of said housings.

4. The apparatus of claim 3 and wherein said support element comprises a sleeve surrounding the lower end portion of a movable frame member, and an elevator screw threadedly connected between said sleeve and the lower end portion of the movable frame member for raising or lowering the sleeve member on the movable frame member.

5. The apparatus of claim 1 and wherein the banks of pickers each comprise a central support platform mounted at opposite ends in the support housing, upper and lower support platforms pivotably mounted to said central platform, and adjusting means connected between said housing and said upper platform and between said housing and said lower platform for tilting said upper and lower platforms with respect to said central platform, said plurality of rotatable disks comprising a plurality of rotatable picking disks mounted along each of said platforms with picking fingers protruding from each picking disk, and drive means mounted to each said platform for rotating said picking disks.

6. The apparatus of claim 5 and wherein said drive means comprises means for rotating alternate ones of the picking disks of a platform in opposite directions of rotation.

7. Apparatus for removing feathers from poultry carcasses moved in succession along a predetermined path of travel comprising:
    two banks of pickers for positioning on opposite sides of the path of travel of the poultry carcasses, each bank of pickers including a plurality of rotatable picking disks with flexible fingers extending therefrom toward the path of travel of the poultry carcasses for engaging the carcases and removing feathers from the carcasses,
    a support frame including parallel support beams for extending across an overhead conveyor system and a pair of movable frame members vertically suspended from each support beam for extending downwardly on opposite sides of the path of travel of the poultry carcasses and movable along the lengths of the support beams toward and away from the path of travel of the poultry carcasses, mounting means movably supported on the lower end portion of each movable frame member for supporting at a level below the support beams an end portion of a bank of pickers, means for moving said movable frame members laterally along the lengths of the support beams, means for raising and lowering each said mounting means along its movable frame member, said mounting means on the movable frame members each including means for rotatably supporting the end portion of a bank of pickers about a horizontal axis whereby the banks of pickers are movable with respect to each other between positions where they are in close facing relationship for removing feathers from poultry carcasses and positions where they are spaced apart a distance sufficient to permit each bank of pickers to be rotated approximately 180° about their horizontal axis to face in the direction opposite the path of travel of the poultry carcasses so that the disks and fingers are easy to clean and repair.

* * * * *